(12) United States Patent
Ito et al.

(10) Patent No.: US 7,052,353 B2
(45) Date of Patent: May 30, 2006

(54) METHOD OF FORMING A PHOSPHOR SCREEN AND AN IMAGE DISPLAY UNIT CONTAINING THE PHOSPHOR SCREEN

(75) Inventors: Takeo Ito, Kumagaya (JP); Tsuyoshi Oyaizu, Fukaya (JP); Hajime Tanaka, Fujioka (JP); Tomoko Nakazawa, Maebashi (JP); Akira Mikami, Fukaya (JP); Hitoshi Tabata, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 145 days.

(21) Appl. No.: 10/476,489

(22) PCT Filed: May 9, 2002

(86) PCT No.: PCT/JP02/04507

§ 371 (c)(1),
(2), (4) Date: Nov. 10, 2003

(87) PCT Pub. No.: WO02/093608

PCT Pub. Date: Nov. 21, 2002

(65) Prior Publication Data

US 2004/0150324 A1 Aug. 5, 2004

(30) Foreign Application Priority Data

May 10, 2001 (JP) .............................. 2001-140285

(51) Int. Cl.
*H01J 1/64* (2006.01)
*H01J 1/70* (2006.01)
*H01J 9/24* (2006.01)
*H01J 9/20* (2006.01)
*H01J 63/04* (2006.01)

(52) U.S. Cl. .................. 445/24; 445/23; 313/496; 427/64; 427/66; 427/67; 427/68

(58) Field of Classification Search ................ 313/496; 445/24

See application file for complete search history.

(56) References Cited

U.S. PATENT DOCUMENTS 6,391,504 B1 * 5/2002 Tai et al. ...................... 430/26
6,833,663 B1 12/2004 Tanaka et al.
2004/0178718 A1 9/2004 Ito et al.

FOREIGN PATENT DOCUMENTS

| EP | 964422 | 12/1999 |
| JP | 63-102139 | 5/1988 |
| JP | 64030134 | * 2/1989 |
| JP | 8-102256 | 4/1996 |

* cited by examiner

*Primary Examiner*—Mariceli Santiago
*Assistant Examiner*—Elizabeth Rielley
(74) *Attorney, Agent, or Firm*—Oblon, Spivak, McClelland, Maier & Neustadt, P.C.

(57) ABSTRACT

A method for forming a phosphor screen comprising the step of forming a phosphor layer containing a thermoplastic resin on the inner surface of a face plate, the step of pressurizing the phosphor layer being heated to plasticate the thermoplastic resin and smooth the surface of the phosphor layer, and the step of forming a metal film on the surface-smoothed phosphor layer and heating the face plate. Thermoplastic resin having a softening temperature of 50–350° C. can be used in the phosphor layer, and 0.05–50 wt % of such a thermoplastic resin in solid content ratio is contained in the layer. Heating/pressurizing conditions preferably involve temperatures of 50–350° C. and pressures of 10–10000 N/cm². This method enhances the film forming property of a metal back layer and prevents cracks and pinholes in the metal back layer.

7 Claims, 3 Drawing Sheets

FIG. IA
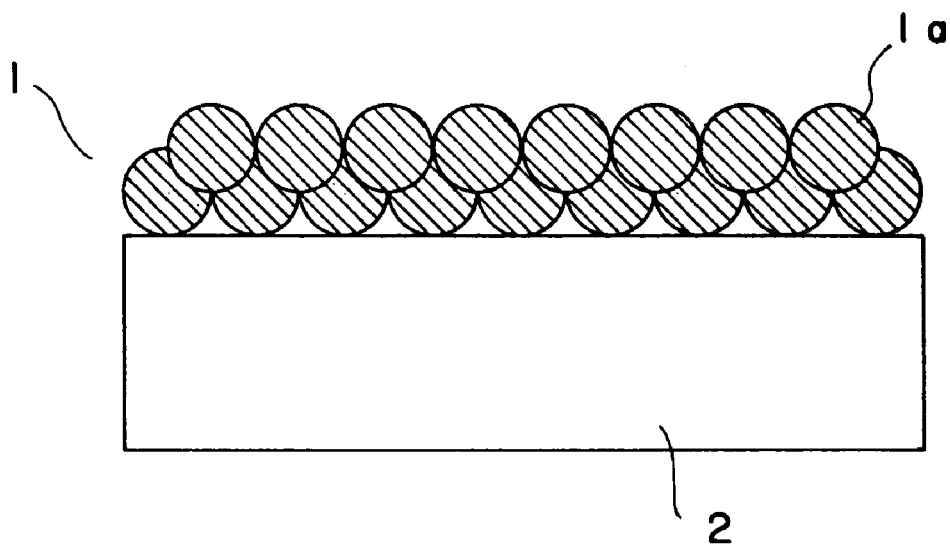
FIG. IB
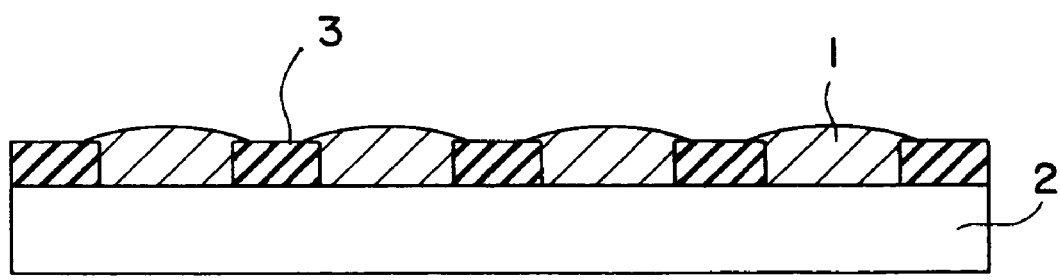

METHOD OF FORMING A PHOSPHOR SCREEN AND AN IMAGE DISPLAY UNIT CONTAINING THE PHOSPHOR SCREEN

TECHNICAL FIELD

The present invention relates to a method for forming a phosphor screen and an image display unit having the phosphor screen.

BACKGROUND ART

For a conventional image display unit such as a cathode-ray tube (CRT) or a field emission display (FED), a metal back-attached phosphor screen, which has a metal film of aluminum (Al) or the like formed on the inner surface (surface opposite to the face plate) of a phosphor layer, has been used extensively.

Such a metal film is called the metal back layer and it reflects light advancing to an electronic source, which is in light emitted from a phosphor material by electrons emitted from the electronic source, toward the face plate to enhance brightness and also serves to stabilize the potential of the phosphor layer as an anode electrode. And, the metal back also has a function to prevent the phosphor layer from being damaged by ions which are generated when gas remaining in a vacuum envelope is ionized.

The metal back layer is generally formed by a method in which a thin film of an organic resin such as nitrocellulose is formed on a phosphor layer by a spin method or the like, aluminum (Al) is vacuum-deposited thereon, and organic substances are removed by baking.

Japanese Patent Laid-Open Application No. Sho 63–102139 or the like proposes a simple method for forming a metal back layer which includes forming a metal film on a film, to which a parting agent is previously applied, by vapor deposition and transferring the metal film onto a phosphor layer with an adhesive agent.

The phosphor screen formed by a conventional method, however, had a phosphor layer 21 with large surface roughness (unevenness) as shown in a magnified form in FIG. 3A and also had largely different levels due to a difference in thickness of the phosphor layers 21 having individual colors as shown in FIG. 3B, so that a film forming property of a metal back layer thereon was poor, and the metal back layer had cracks, pinholes and the like. In the drawing, reference numeral 21a denotes phosphor particles forming the phosphor layer 21, 22 denotes a glass substrate, and 23 denotes a light absorption layer (light-shielding layer).

And, there was a disadvantage that a withstand pressure characteristic of the phosphor screen was degraded because of cracks, wrinkles, pinholes and the like of the metal back layer. It was also difficult to obtain a phosphor screen having high brightness, and particularly a display unit such as an FED operating in a low-speed electron beam area had inconsistencies in brightness.

The present invention has been made to remedy the above disadvantages and provides a method for forming a phosphor screen with the occurrence of cracks, pinholes and the like prevented by improving a film forming property of a metal back layer, and an image display unit which provides a high metal back effect, excels in a withstand voltage characteristic and can make high quality display with high brightness.

SUMMERY OF THE INVENTION

The method for forming a phosphor screen of the present invention comprises forming a phosphor layer containing a thermoplastic resin on the inner surface of a face plate, pressurizing the phosphor layer being heated to plasticate the thermoplastic resin and to smooth the surface of the phosphor layer, forming a metal film on the surface-smoothed phosphor layer, and heating the face plate having the metal film.

According to the method for forming a phosphor screen of the invention, a thermoplastic resin having a softening temperature of 5 to 350° C. may be used. A solid content ratio of the thermoplastic resin in the phosphor layer may be 0.05 to 50 wt %.

Besides, the phosphor layer being heated to a temperature of 50 to 350° C. may be pressurized under pressure of 10 to 10000 N/cm$^2$ in the step of pressurizing the phosphor layer. Furthermore, forming the metal film may include disposing a transfer film, which has a parting agent layer, the metal film and an adhesive agent layer superposed sequentially on a base film so to have the metal film come into contact with the phosphor layer through the adhesive-agent layer, pressing to adhere the metal film, and then peeling the base film to transfer the metal film onto the phosphor layer.

The image display unit of the present invention comprises the phosphor screen formed by the method for forming a phosphor screen on the inner surface of a face plate. Besides, another aspect of the image display unit of the invention comprises an envelope having a face plate and a rear plate disposed to oppose the face plate, multiple electron emission elements formed on the rear plate, a phosphor screen formed on the face plate to oppose the rear plate so to emit light by an electron beam emitted from the electron emission elements, wherein the phosphor screen is formed by the above-described method for forming a phosphor screen.

According to the present invention, a metal back layer (metal film) free from cracks, pinholes or the like and having good characteristics is formed, and a phosphor screen having a high metal back effect and a substantially improved withstand voltage characteristic is obtained. And, the phosphor screen is improved its emission brightness because denseness of the phosphor layer is improved.

BRIEF DESCRIPTION OF THE DRAWINGS

FIG. 1A and FIG. 1B are sectional diagrams schematically showing a state of the phosphor screen formed by a first embodiment of the invention.

BEST MODE FOR CARRYING OUT THE INVENTION

Figure 2:
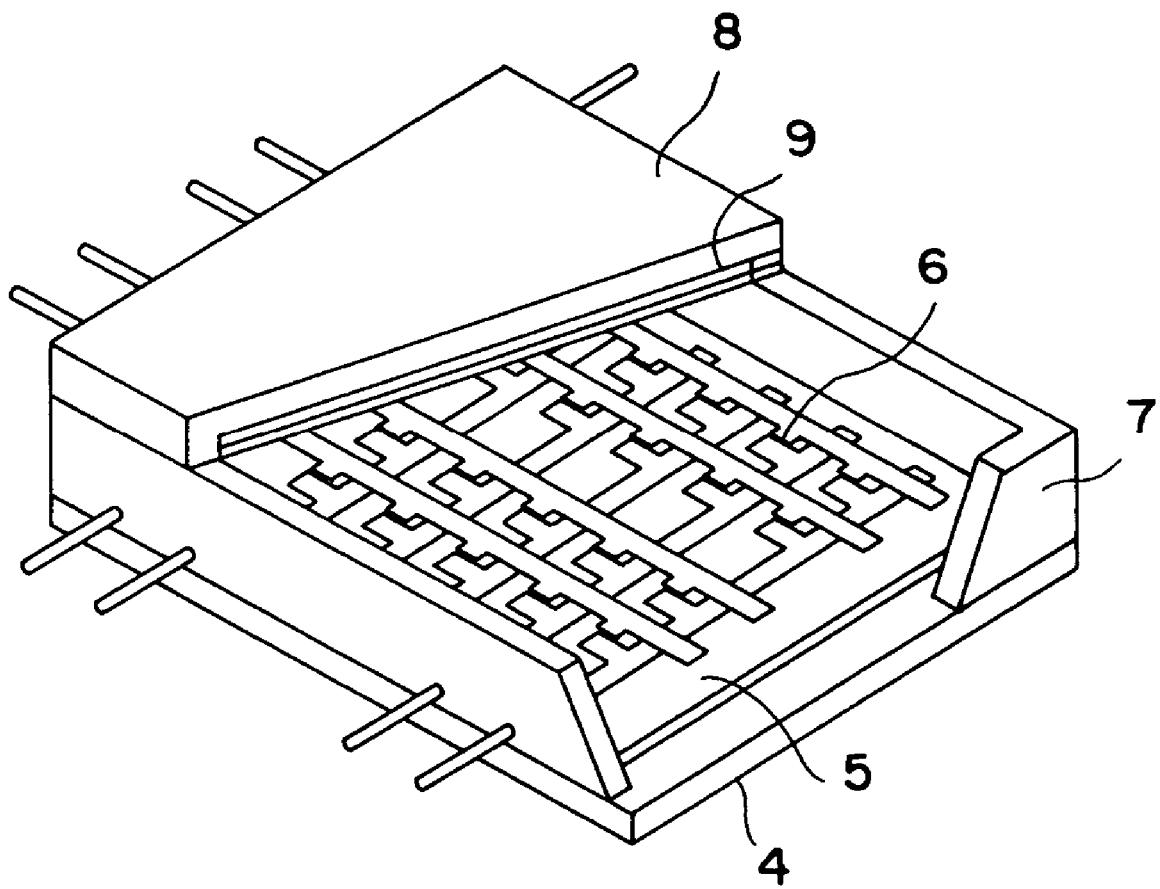
FIG. 2 is a perspective diagram of an FED having the metal back-attached phosphor screen formed by Example 1 of the invention.
Figure 3A:
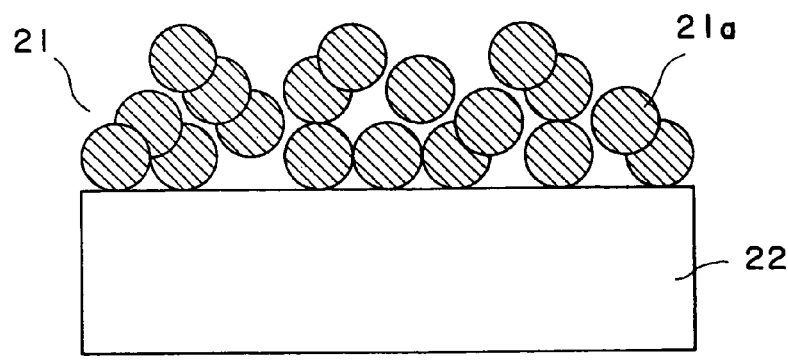
FIG. 3A and FIG. 3B are sectional diagrams schematically showing a state of the phosphor screen formed by a conventional method.
Figure 3B:
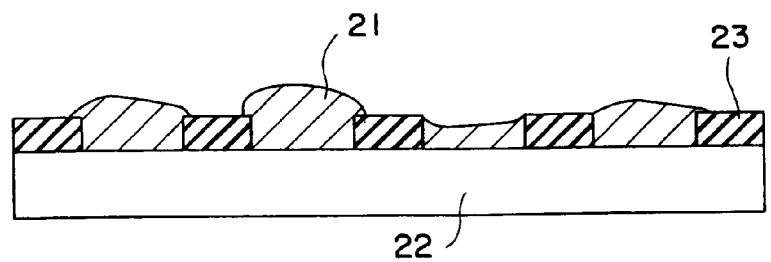

Embodiments of the invention will be described below. It is to be understood that the present invention is not limited to the following embodiments.

According to a first embodiment of the invention, a light absorption layer having a prescribed pattern (a dot or stripe pattern) is formed as black matrix (BM) on the inner surface of a face plate, and a phosphor layer containing a thermoplastic resin is formed in the prescribed pattern. Specifically, the light absorption layer of a black pigment and having, for example, a stripe pattern is formed by a photolithography, and a mixed liquid containing ZnS-based, $Y_2O_3$-based or $Y_2O_2S$-based phosphor material of individual colors and a thermoplastic resin is applied to the aforesaid layer by a slurry method, a spray method, a printing method or the like and dried. And, patterning is conducted by photolithography to form a three-color phosphor layer pattern of red (R), green (G) and blue (B).

The thermoplastic resin can be used without limiting to a particular kind if the thermoplastic resin can have good flowability under heating/pressurizing conditions to be described later and it can be decomposed/removed by a heat treating (baking) step after forming the metal back layer. It is particularly desirable to use a thermoplastic resin having a softening temperature of 50 to 350° C. As the thermoplastic resin, for example, polyvinyl alcohol, polyvinyl pyrrolidone, polyvinyl chloride, polyvinyl acetate, polystyrene, ethyl cellulose and the like can be used.

And, a ratio of the thermoplastic resin in the phosphor layer is desirably 0.05 to 50 wt % in solid content ratio.

Then, the phosphor layer formed as described above is pressurized while heating to smooth the surface of the phosphor layer. The thermoplastic resin for binding phosphor particles in the phosphor layer are plasticated (fluidized) by heating, and in that state, a proper pressure is applied in a direction perpendicular to the surface of the phosphor layer to smooth the surface. The pressurizing method is not particularly limited, and a method of applying a uniaxial pressure or a hydrostatic pressure or a method of applying a pressure by a roller can be used.

It is determined in this step that a heating temperature is 50 to 350° C., and more preferably 100 to 250° C., and an applied pressure is 10 to 10000 $N/cm^2$, and more preferably 500 to 5000 $N/cm^2$ in flowability of the thermoplastic resin, mobility of the phosphor particles and heat resistance of the glass substrate. When the heating temperature is lower than 50° C., the fluidization of the thermoplastic resin contained in the phosphor layer is insufficient, and the phosphor particles are tightly bound to the thermoplastic resin. Therefore, to release and move the phosphor particles from the binding by the thermoplastic resin, a pressure of exceeding 10000 $N/cm^2$ is required, and damage is given to the phosphor particles by such an excessive pressure, possibly resulting in extensive deterioration of brightness. And, when the heating temperature exceeds 300° C., a sufficient pressure cannot be applied in order to prevent the glass substrate from being deformed by a high temperature, and the surface of the phosphor layer might not be smoothed sufficiently.

The structure of the phosphor screen obtained as described above is shown sectionally in FIGS. 1A, 1B (FIG. 1A being a magnified diagram). As shown in FIG. 1A, the surface of a phosphor layer 1 is smoothed, the surface roughness is reduced to remedy unevenness, and a difference in level of the phosphor layer 1 of individual colors is reduced as shown in FIG. 1B. And, denseness (packed degree) of phosphor particles 1*a* in the phosphor layer 1 is also improved by such forced pressurizing. In the drawing, reference numeral 2 denotes a glass substrate, and 3 denotes a light absorption layer.

Next, a metal back layer is formed on the surface-smoothed phosphor layer. To form the metal back layer, there can be adopted a method by which Al or the like is vacuum-deposited on a thin film of an organic resin such as nitrocellulose formed by, for example, a spin method, and organic material is removed by baking.

The metal back layer can also be formed by using the transfer film described below.

The transfer film has a structure in that a metal film of Al or the like and an adhesive agent layer are superposed sequentially on a base film of polyester resin or the like through a parting agent layer and also a protective film if necessary. This transfer film is disposed so that the adhesive agent layer is contacted with the phosphor layer and pressurized. As a pressing method, a stamp method, a roller method or the like is available. Thus, the transfer film is pressed to adhere the metal film, and the base film is peeled so as to transfer the metal film to the phosphor layer. Then, the face plate in which the metal film is transferred to the phosphor layer is heated for baking at a temperature of approximately 450° C. to decompose/remove the organic contents. The thermoplastic resin contained in the phosphor layer is also decomposed/removed by heating.

Thus, the metal back layer which is free from cracks, pinholes or the like and has remarkable characteristics is formed, and the phosphor screen having high metal back effects and a significantly improved withstand voltage characteristic can be obtained. Besides, denseness of the phosphor layer is improved, so that emission brightness of the phosphor screen is improved. And, by forming the phosphor screen on the inner surface of the face plate by such a method, an image display unit, which has a high effect of the metal back layer and a good withstand voltage characteristic and can make highly bright and high quality display, is obtained.

Then, specific examples of the invention will be described.

EXAMPLE 1

First, a blue phosphor slurry, a green phosphor slurry and a red phosphor slurry having the following compositions were prepared.

| [Blue phosphor slurry] | |
| --- | --- |
| Pure water (hereinafter referred to as parts) | 40.0 parts by weight |
| Blue phosphor material (ZnS:Ag, Cl) | 44.0 parts |
| Polyvinyl alcohol | 15.5 parts |
| Sodium dichromate (10% solution) | 0.5 part |

| [Green phosphor slurry] | |
| --- | --- |
| Pure water | 40.0 parts |
| Green phosphor material (ZnS:Cu, Al) | 44.0 parts |
| Polyvinyl alcohol | 15.5 parts |
| Sodium dichromate (10% solution) | 0.5 part |

| [Red phosphor slurry] | |
| --- | --- |
| Pure water | 40.0 parts |
| Red phosphor material ($Y_2O_2S$:Eu) | 44.0 parts |
| Polyvinyl alcohol | 15.5 parts |
| Sodium dichromate (10% solution) | 0.5 part |

Then, the above-described phosphor slurries of the individual colors were applied to a glass substrate, on which a striped light absorption layer (BM) of a black pigment was previously formed at a prescribed position, by a spin coater and dried. The prescribed position was exposed for development with a mercury lamp so to form the phosphor layer of individual colors of red (R), green (G) and blue (B) into a stripe pattern. A phosphor screen having the striped light absorption layer and the phosphor layers of three colors were formed.

The phosphor screen was pressurized under a uniaxial pressure of 4900 N/cm² for 30 seconds while heating to 150° C., and surface roughness of the phosphor screen and a difference in thickness (maximum value) of the phosphor layers having the individual colors were measured.

Then, a metal back layer was formed on it as described below. Specifically, an organic resin solution mainly including acrylic resin was applied to the phosphor screen, which had undergone the heating/pressurizing treatment, and dried to form an organic resin layer, then an Al film was formed on it by vacuum deposition. Then, the metal back-attached phosphor screen was heated for baking at a temperature of 450° C. for 30 minutes to decompose/remove the organic contents, and the Al film was examined for evaluation of the presence or not and state of cracks and pinholes.

As Comparative Example 1, the phosphor screen formed in the same way as in Example 1 was not subjected to the heating/pressurizing treatment but measured the surface roughness and a difference in thickness (maximum value) of the phosphor layers of the individual colors, and a metal back layer was formed on the phosphor screen and baked in the same way as in Example 1. The formed metal back layer (Al film) was examined for cracks and pinholes and evaluated.

Table 1 shows the results of measurement and evaluation in Example 1 and Comparative Example 1. For evaluation, the Al films not having any cracks or pinholes are indicated by ⊚, those having a few cracks or pinholes but not having a problem in practice are indicated by ○, those having cracks or pinholes and having a problem of degrading another characteristic in practice are indicated by Δ and those not practicable are indicated by X.

Then, panels having the metal back-attached phosphor screens obtained in Example 1 and Comparative Example 1 were used to fabricate FEDs by a common procedure. First, an electron generation source, which had a large number of surface conduction type electron emission elements formed in a matrix form on a substrate, was fixed to a glass substrate to produce a rear plate. Then, the rear plate and the panel (face plate) were disposed to oppose mutually through a support frame and sealed with flit glass, and required procedures such as evacuation, sealing and the like were conducted to complete the FEDs having the structure as shown in FIG. 2. In the drawing, reference numeral 4 denotes a rear plate, 5 denotes a substrate, 6 denotes surface conduction type electron emission elements, 7 denotes a support frame, 8 denotes a face plate, and 9 denotes a metal back-attached phosphor screen.

The FEDs obtained as described above were measured for evaluation of a withstand voltage characteristic by a common procedure. The evaluated results are shown in Table 1. The withstand voltage characteristic was evaluated in a range of good to impracticable levels indicated by four levels of ⊚, ○, Δ and X. Those evaluated and indicated by ○ or better one are practicable.

EXAMPLE 2

First, a blue phosphor paste, a green phosphor paste and a red phosphor paste having the following compositions were prepared.

| [Blue phosphor paste] | |
|---|---|
| Butyl carbitol acetate | 50.0 parts |
| Blue phosphor material (ZnS:Ag, Cl) | 4.0 parts |
| Ethyl cellulose | 46.0 parts |

| [Green phosphor paste] | |
|---|---|
| Butyl carbitol acetate | 50.0 parts |
| Green phosphor material (ZnS:Cu, Al) | 4.0 parts |
| Ethyl cellulose | 46.0 parts |

| [Red phosphor paste] | |
|---|---|
| Butyl carbitol acetate | 50.0 parts |
| Red phosphor material ($Y_2O_2S$:Eu) | 4.0 parts |
| Ethyl cellulose | 46.0 parts |

Then, the above-described phosphor pastes of the individual colors were applied to a glass substrate, on which a striped light absorption layer (BM) of a black pigment was previously formed at a prescribed position, by a screen printing method and dried so to form the phosphor layer of individual colors of red (R), green (G) and blue (B) into a stripe pattern.

Next, the phosphor screen having the light absorption layer and the phosphor layers of three colors formed as described above was pressurized under 980 N/cm² by a roller at a speed of 1 m/min while heating to a temperature of 150° C., and a metal back layer was formed on the phosphor screen in the same way as in Example 1.

Then, this metal back-attached phosphor screen was heated for baking at 450° C. for 30 minutes to decompose and remove the organic contents, and the Al film was examined for evaluation of the presence or not and state of cracks and pinholes.

As Comparative Example 2, the phosphor screen formed in the same way as in Example 2 was not subjected to the heating/pressurizing treatment but measured the surface roughness and a difference in thickness of the phosphor layer of the individual colors, and a metal back layer was formed on the phosphor screen and baked in the same way as in Example 2. The metal back layer (Al film) was examined for cracks and pinholes and evaluated. Results of measurement/ evaluation of Example 2 and Comparative Example 2 are shown in Table 1.

Then, panels having the metal back-attached phosphor screens obtained in Example 2 and Comparative Example 2 were used to fabricate FEDs in the same way as in Example 1. The obtained FEDs were measured for evaluation of their withstand voltage characteristic by a common procedure. The evaluated results are shown in Table 1.

EXAMPLE 3

The phosphor screen formed by Example 2 was pressurized under 980 N/cm² by a roller at a speed of 1 m/min while heating to 150° C., and a metal back layer was formed on the phosphor screen by a transfer method.

Specifically, the transfer film, in which the Al film was superposed on the base film of polyester resin or the like through a parting agent layer, the adhesive agent layer being formed thereon, was disposed on the phosphor screen so to contact the adhesive agent layer with the phosphor screen undergone the heating/pressurizing treatment and pressed by a heating roller for intimate adhesion, then the base film was peeled to adhere the Al film onto the phosphor screen.

Then, the phosphor screen to which the Al film was transferred was heated for baking at 450° C. for 30 minutes to decompose/remove the organic contents, and the Al film was examined for evaluation of the presence or not of cracks and pinholes.

As Comparative Example 3, the phosphor screen formed in the same way as in Example 2 was not undergone the heating/pressurizing treatment but had a metal back layer formed on it by the transfer method and baked in the same way as in Example 3. The formed metal back layer (Al film) was examined for evaluation of cracks and pinholes. The evaluated results are shown in Table 1.

Then, panels having the metal back-attached phosphor screens obtained in Example 3 and Comparative Example 3 were used to fabricate FEDs in the same way as in Example 1. The obtained FEDs were measured for evaluation of a withstand voltage characteristic by a common procedure. The evaluated results are shown in Table 1.

TABLE 1

|  | E1 | E2 | E3 | CE1 | CE2 | CE3 |
|---|---|---|---|---|---|---|
| Surface roughness of phosphor layer (μm) | 0.9 | 1.0 | 1.0 | 2.5 | 1.9 | 1.9 |
| Max thickness difference of phosphor layer of individual colors (μm) | 0.5 | 0.2 | 0.2 | 8.0 | 5.0 | 5.0 |
| Evaluation of Al film |  |  |  |  |  |  |
| Cracks | ○ | ○ | ◎ | △ | △ | △ |
| Pin holes | ○ | ○ | ◎ | X | △ | ○ |
| Withstand voltage characteristic | ○ | ○ | ◎ | △ | △ | △ |

E1 = Example 1,
E2 = Example 2,
E3 = Example 3,
CE1 = Comparative Example 1,
CE2 = Comparative Example 2,
CE3 = Comparative Example 3

It is apparent from the results shown in Table 1 that the Al film-attached phosphor screens formed in Examples 1 to 3 are free from any cracks or pinholes in the Al film and have an improved film forming property as compared with those formed by Comparative Examples 1 to 3. And, it is seen that the metal back-attached phosphor screen having such a metal back layer is improved its withstand voltage characteristic remarkably.

INDUSTRIAL APPLICABILITY

As described above, according to the method for forming a phosphor screen of the present invention, pressurization of the phosphor layer containing the thermoplastic resin while heating reduces substantially a difference in level due to the surface roughness of the phosphor layer and a difference in thickness among the phosphor layers of individual colors without damaging the phosphor material, and the surface of the phosphor layer can be smoothed, so that the film forming property of the metal back layer to be formed thereon is improved, and the good metal back layer free from cracks or pinholes can be obtained. Therefore, the image display unit having such a phosphor screen has a substantially improved withstand voltage characteristic, and display with high brightness can be realized without suffering from deterioration of brightness. Especially, a low-voltage driven display unit can make high quality display without inconsistencies in brightness.

What is claimed is:

1. A method for forming a phosphor screen, comprising:
   forming a phosphor layer containing a thermoplastic resin in a ratio of 25 to 50 wt% (solid content ratio) on the inner surface of a face plate;
   pressurizing the phosphor layer being heated to plasticate the thermoplastic resin and to smooth the surface of the phosphor layer;
   forming a metal film on the surface-smoothed phosphor layer; and
   heating the face plate having the metal film.

2. The method for forming a phosphor screen according to claim 1, wherein the thermoplastic resin has a softening temperature of 50 to 350° C.

3. The method for forming a phosphor screen according to claim 1, wherein the phosphor layer being heated to a temperature of 50 to 350° C. is pressurized under pressure of 500 to 5000 N/cm² in the step of pressurizing the phosphor layer.

4. The method for forming a phosphor screen according to claim 1, wherein forming the metal film includes disposing a transfer film, which has a parting agent layer, the metal film and an adhesive agent layer superposed sequentially on a base film so to have the metal film come into contact with the phosphor layer, the adhesive agent layer intervening therebet-ween, pressing to adhere the metal film, and then peeling the base film to transfer the metal film onto the phosphor layer.

5. An image display unit, comprising the phosphor screen, which is formed according to claim 1, on the inner surface of a face plate.

6. An image display unit, comprising an envelope having a face plate and a rear plate disposed to oppose the face plate, multiple electron emission elements formed on the rear plate, and a phosphor screen formed on the face plate to oppose the rear plate so to emit light by an electron beam emitted from the electron emission elements, wherein the phosphor screen is formed according to claim 1.

7. The method for forming a phosphor screen according to claim 1, wherein forming the phosphor layer includes applying a mixed liquid containing the phosphor material and the thermoplastic resin to the face plate by a slurry method.

* * * * *